US009869747B2

(12) United States Patent
Inoue et al.

(10) Patent No.: US 9,869,747 B2
(45) Date of Patent: Jan. 16, 2018

(54) INDOOR POSITION INFORMATION PROVIDING APPARATUS, POSITION NOTIFIER APPARATUS AND PROGRAM

(71) Applicant: DENSO CORPORATION, Kariya, Aichi-pref. (JP)

(72) Inventors: Toru Inoue, Nagoya (JP); Toshiaki Nakayama, Miyoshi (JP)

(73) Assignee: DENSO CORPORATION, Kariya (JP)

( * ) Notice: Subject to any disclaimer, the term of this patent is extended or adjusted under 35 U.S.C. 154(b) by 229 days.

(21) Appl. No.: 14/745,816

(22) Filed: Jun. 22, 2015

(65) Prior Publication Data

US 2015/0378001 A1 Dec. 31, 2015

(30) Foreign Application Priority Data

Jun. 26, 2014 (JP) ................................ 2014-131371

(51) Int. Cl.
*G01S 5/18* (2006.01)
*G01S 5/00* (2006.01)
*G01S 1/72* (2006.01)

(52) U.S. Cl.
CPC ............ *G01S 5/0045* (2013.01); *G01S 1/725* (2013.01); *G01S 5/18* (2013.01)

(58) Field of Classification Search
CPC . G01S 5/00; G01S 5/18; G01S 5/0045; G01S 1/725
USPC .................................................. 367/137, 178
See application file for complete search history.

(56) References Cited

U.S. PATENT DOCUMENTS 6,130,626 A * 10/2000 Kane .................... G08G 1/0104 235/384
7,171,329 B2 * 1/2007 Rodman ................. H04M 3/56 342/450
7,251,535 B2 * 7/2007 Farchmin ........... G05B 19/4184 700/108
7,272,456 B2 * 9/2007 Farchmin ............. G05B 19/122 455/456.1
7,298,275 B2 * 11/2007 Brandt ............... G05B 19/4183 340/573.1

(Continued)

FOREIGN PATENT DOCUMENTS

WO 2013/108243 A1 7/2013

OTHER PUBLICATIONS

The Extended European Search Report dated Dec. 4, 2015 in the corresponding EP application No. 15172713.8.

*Primary Examiner* — Luke Ratcliffe
*Assistant Examiner* — Amie M N'Dure
(74) *Attorney, Agent, or Firm* — Posz Law Group, PLC

(57) ABSTRACT

A position information providing apparatus for providing present position information to a position notifier apparatus is provided. The position information providing apparatus includes an ultrasonic wave output device for outputting ultrasonic wave and a controller for controlling the ultrasonic wave output device. In accordance with contents of the present position information, the controller sequentially selects a modulation frequency from among multiple detectable frequencies which are detectable by the position notifier apparatus and which are lower than an ultrasonic wave frequency. The controller controls the ultrasonic wave output device so that a maximum value or a minimum value of amplitude of the ultrasonic wave varies with to the selected modulation frequency.

7 Claims, 11 Drawing Sheets

(56) References Cited

U.S. PATENT DOCUMENTS

| | | | | |
|---|---|---|---|---|
| 7,333,018 | B2 * | 2/2008 | Singh | G01S 5/02 340/10.1 |
| 7,671,718 | B2 * | 3/2010 | Turner | G07C 9/00087 340/10.1 |
| 7,916,577 | B2 * | 3/2011 | Jeong | G01S 5/30 367/128 |
| 7,952,483 | B2 * | 5/2011 | Ferguson | A61B 5/1124 340/13.2 |
| 8,190,730 | B2 * | 5/2012 | Dempsey | G01S 5/02 340/571 |
| 8,249,298 | B2 * | 8/2012 | Saleh | G01S 3/808 382/103 |
| 2002/0167417 | A1 * | 11/2002 | Welles, II | G01S 1/725 340/8.1 |
| 2005/0046584 | A1 * | 3/2005 | Breed | B60C 11/24 340/13.31 |
| 2009/0115661 | A1 | 5/2009 | Torimoto et al. | |
| 2009/0154294 | A1 * | 6/2009 | Jeong | G01S 5/30 367/128 |
| 2010/0157738 | A1 * | 6/2010 | Izumi | G01S 3/48 367/125 |
| 2014/0043943 | A1 * | 2/2014 | Lavery | G01S 1/74 367/118 |

* cited by examiner

INDOOR POSITION INFORMATION PROVIDING APPARATUS, POSITION NOTIFIER APPARATUS AND PROGRAM

CROSS REFERENCE TO RELATED APPLICATION

The present application is based on Japanese Patent Application No. 2014-131371 filed on Jun. 26, 2014, disclosure of which is incorporated herein by reference.

TECHNICAL FIELD

The present disclosure relates to an indoor position information providing apparatus, a position notifier apparatus and a program for providing position information in an indoor place.

BACKGROUND

In order to provide position information in GPS positioning signal undetectable places such as an indoor place or an underground shopping center, a known system includes an indoor transmitter. The indoor transmitter is installed in the indoor place to transmit a positioning signal indicating an indoor position to a portable terminal (e.g., JP 4296302B corresponding to US 2009/0115661A).

The inventor of the present application has found that the technology described in Patent Literature 1 involves the following disadvantage. In order for the portable terminal to receive the positioning signal from the indoor transmitter, all of the existing typical portable terminals should be replaced.

SUMMARY

The present disclosure is made in view of the foregoing. It is an object of the present disclosure to provide a technology that enables positioning in an indoor place without replacing portable terminals.

According to a first aspect of the present disclosure, there is provided a position information providing apparatus for providing present position information indicating a present position to a position notifier apparatus having a function to notify the present position. The position information providing apparatus comprises an ultrasonic wave output device and a controller.

The ultrasonic wave output device outputs ultrasonic wave having a predetermined ultrasonic frequency. The controller has a plurality of predetermined detectable frequencies which are within a frequency range detectable by a speech input device of the position notifier apparatus and which are lower than the ultrasonic wave frequency. The controller sequentially selects one detectable frequency as a modulation frequency from among the plurality of detectable frequencies in accordance with contents of the present position information, and controls the ultrasonic wave output device so that a maximum value or a minimum value of amplitude of the ultrasonic wave varies with the selected modulation frequency.

According to the above configuration, the position information providing apparatus uses the ultrasonic wave to convey the present position information to the position notifier apparatus. The ultrasonic wave has high directivity. Therefore, the position information providing apparatus can minimize a difference between the actual present position of the position notifier apparatus and the present position indicated by the ultrasonic wave inputted to the speech input device of the position notifier apparatus.

Moreover, in accordance with the contents of the present position information, the position information providing apparatus outputs the ultrasonic wave modulated with the modulation frequency, wherein the modulation frequency is detectable by the speech input device. Accordingly, the position notifier apparatus can acquire the present position information by detecting the modulation frequency of the ultrasonic wave inputted to the speech input device. Therefore, according to the above position notifier apparatus, it becomes possible to provide the present position information to the position notifier apparatus without replacement of position notifier apparatuses. This is because the speech input device originally equipped in the position notifier apparatus is usable to the input of the ultrasonic wave outputted from the position information providing apparatus. Moreover, because each position information providing is not required to be connected to a network, it is unnecessary to install the network when newly installing the position information providing apparatus.

According to a second aspect of the present disclosure, there is provided a position notifier apparatus having a function to notify a present position. The position notifier apparatus comprises a speech input device and a position information acquisition device. The speech input device inputs the ultrasonic wave outputted from the position information providing apparatus. The position information acquisition device detects the modulation frequency of the ultrasonic wave inputted to the speech input device, and acquires the present position from the ultrasonic wave based on the detected modulation frequency.

The above position notifier apparatus can acquire the present position information by receiving the ultrasonic wave from the position information providing apparatus, and can provide substantially the same technical advantages as the position information providing apparatus.

According to a third aspect of the present disclosure, there is provided a program that causes a computer to function as the position information acquisition device of the position notifier apparatus. The computer controlled by the program constitutes a part of the position notifier apparatus and can provide substantially the same technical advantages as the position notifier apparatus.

The program may be stored in a non-transitory computer readable storage medium and may be executed by a computer. The storage medium may be a portable storage medium or a non-transitory storage medium pre-installed in the computer. Alternatively, the program may be downloaded to a computer via a network.

BRIEF DESCRIPTION OF THE DRAWINGS

The above and other objects, features and advantages of the present disclosure will become more apparent from the below-described detailed description made with reference to the accompanying drawings, in which.

DETAILED DESCRIPTION

Embodiments will be described with reference to the drawings.

Figure 1:
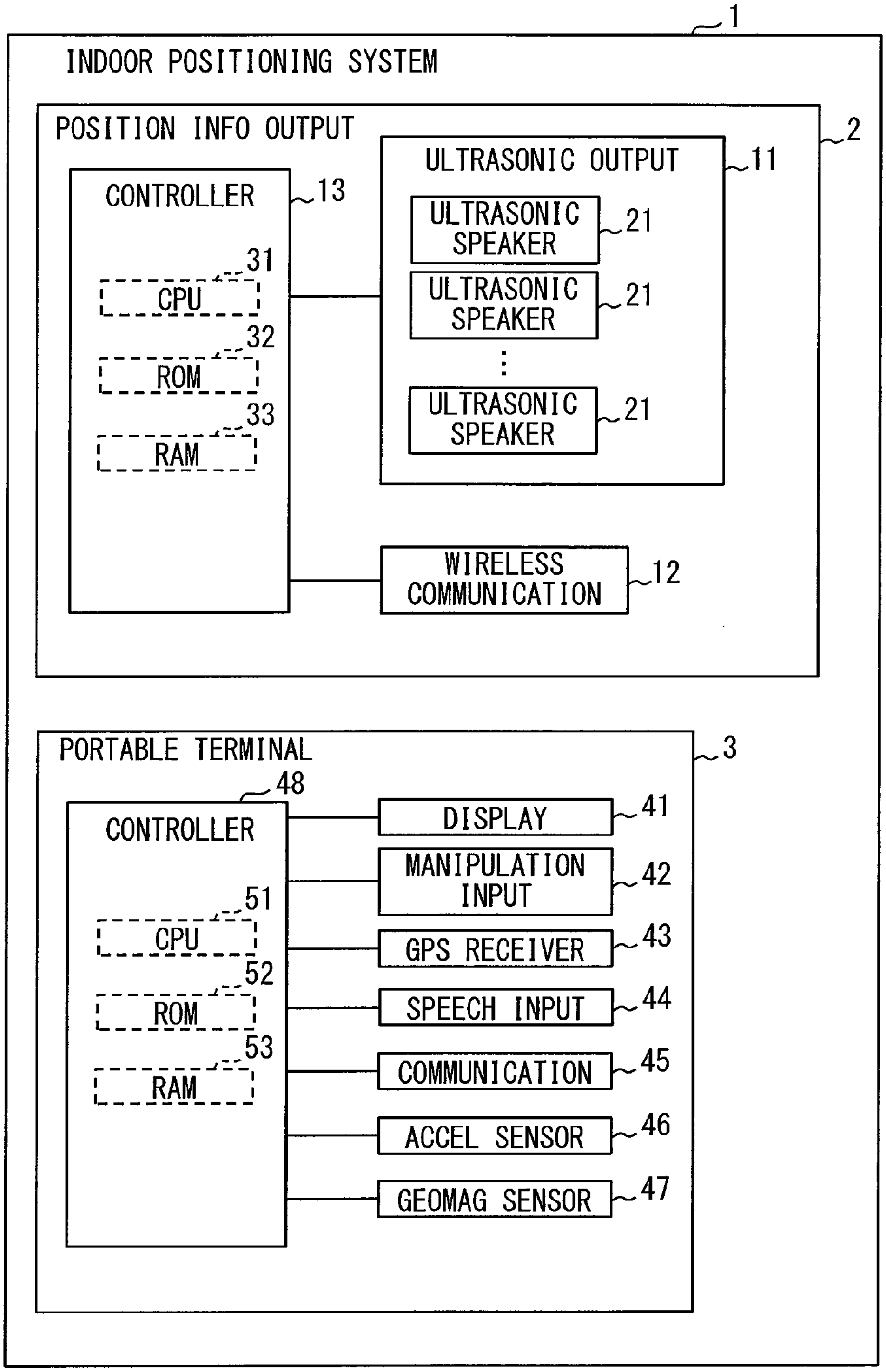
FIG. 1 is a block diagram illustrating a configuration of an indoor positioning system.

As shown in FIG. 1, an indoor positioning system 1 of the present embodiment includes a position information output apparatus 2 and a portable terminal 3.

The positional information output apparatus 2 includes an ultrasonic output device 11, a wireless communication device 12, and a controller 13. The ultrasonic output device 11 includes multiple ultrasonic speakers 21, for example, 36 ultrasonic speakers. The ultrasonic speaker 21 outputs ultrasonic wave having an ultrasonic output frequency, e.g., 40 kHz.

The wireless communication device 12 transmits and receives data using a predetermined wireless communication system, e.g., Bluetooth (registered trademark). The controller 13 includes a CPU 31, a ROM 32 and a RAM 33, and controls the ultrasonic output device 11 and the wireless communication device 12 by executing processing with the CPU 31 based on a program stored in the ROM 32.

When the controller 13 receives a rewriting request command from a program rewriting apparatus (not shown) via the wireless communication device 12, the controller 13 performs rewriting processing in which a new program transmitted from the program rewriting apparatus through the wireless communication device 12 is written in the ROM 32.

The portable terminal 3 includes a display device 41, a manipulation input device 42, a GPS (Global Positioning System) receiver 43, a speech input device 44, a communication device 45, an acceleration sensor 46, a geomagnetic sensor 47, and a controller 48.

The display device 41 includes a display (not shown) installed in the front face of the case of the portable terminal 3, and displays various images on a display screen of the display. The manipulation input device 42 includes a touch panel provided on the display screen of the display device 41 and a switch provided in the periphery of the display screen of the display device 41. The manipulation-input device 42 outputs input manipulation information for specifying the input manipulation made by a user via the touch panel or the switch The GPS receiver 43 receives positioning signals (also called herein a GPS positioning signal) transmitted from GPS satellites. The speech input device 44 is for inputting a speech uttered by the user during voice communications using the portable terminal 3. The speech input device 44 generates an electrical signal representing the inputted speech and outputs the generated electrical signal.

The communication device 45 performs data communications through a cellular phone communication network. The acceleration sensor 46 detects a magnitude and a direction of the acceleration of the portable terminal 3. The geomagnetic sensor 47 detects a magnitude and a direction of geomagnetism.

The controller 48 includes a CPU 51, a ROM 52, and a RAM 53. The CPU 51 performs processing based on a program stored in the ROM 52. The controller 48 performs a variety of processing based on inputs from the manipulation-input device 42, the GPS receiver 43, the speech input device 44, the communication device 45, the acceleration sensor 46, and the geomagnetic sensor 47, and controls the display device 41 and the communication device 45.

Figure 2:
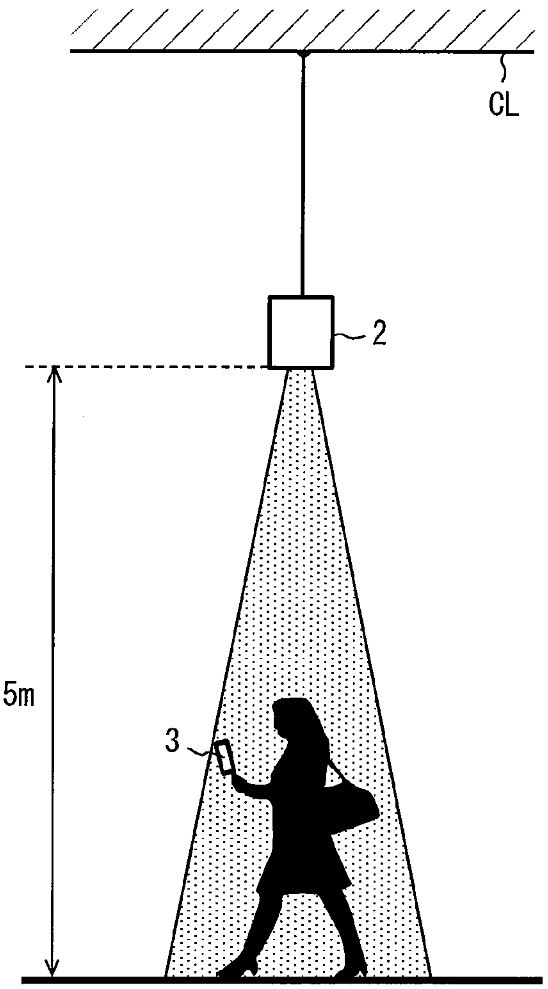
FIG. 2 is a side view illustrating an installation position of a position information output apparatus.
Figure 3:
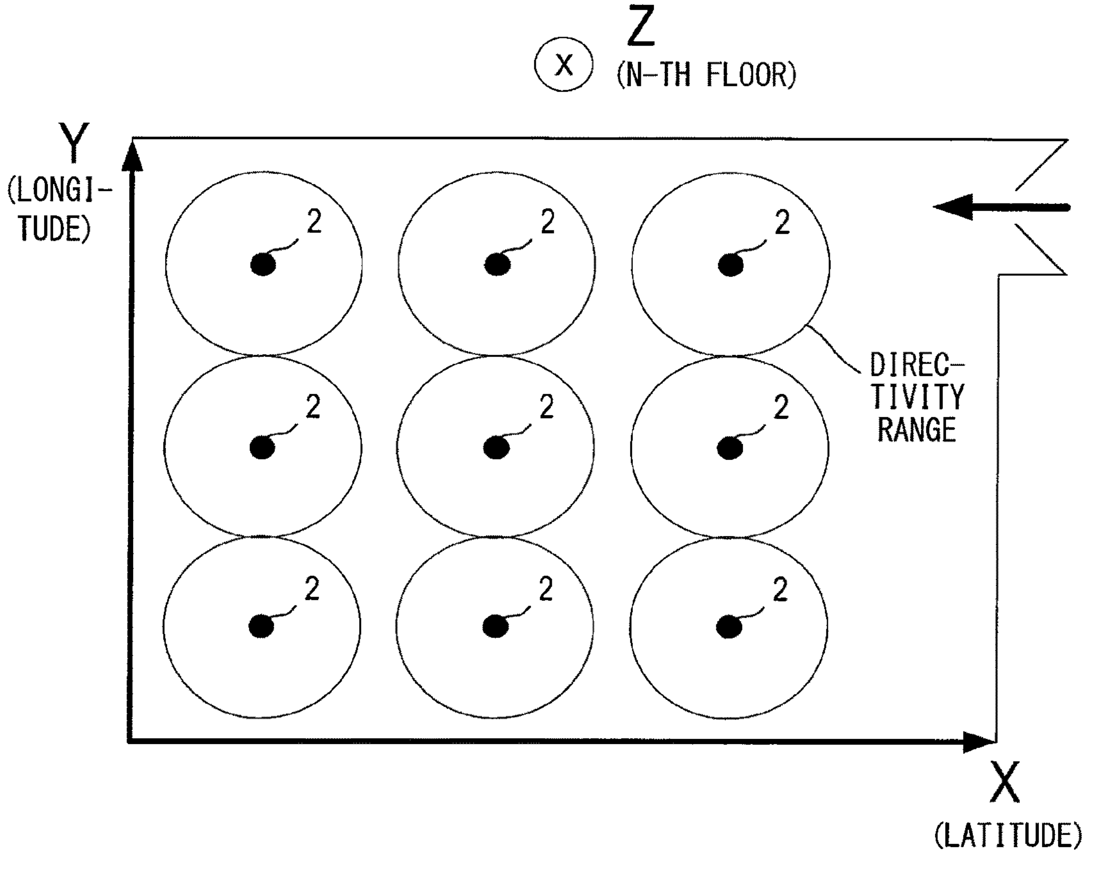
FIG. 3 is a plane view illustrating the installation position of the position information output apparatus.

As shown in FIG. 2, the positional information output apparatus 2 is provided to a ceiling CL of an indoor space and outputs ultrasonic wave downward from the ceiling CL. As shown in FIG. 3, the positional information output apparatuses 2 are arranged in a two dimensional matrix form on a plane defining the ceiling CL of the indoor space.

Figure 4:
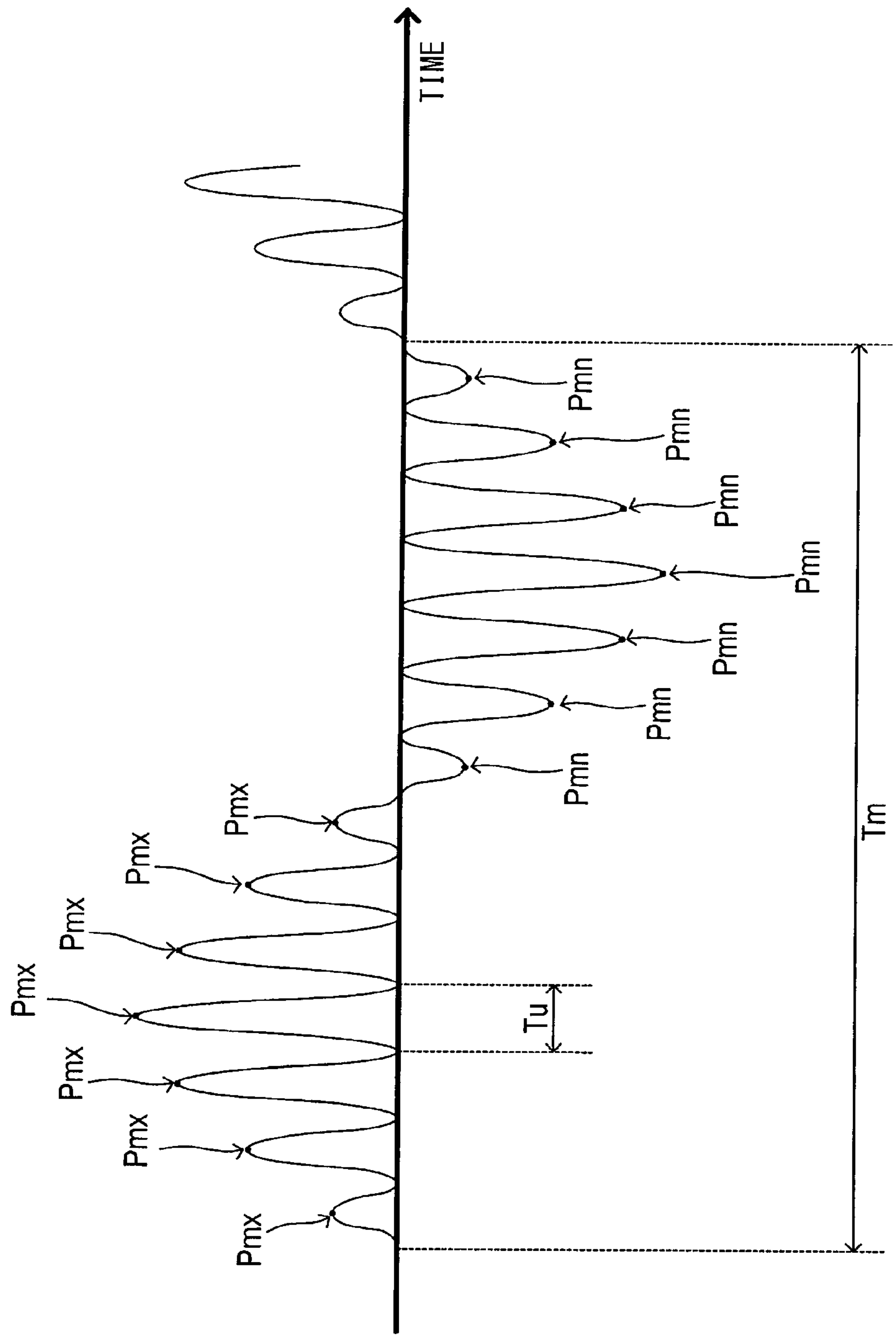
FIG. 4 is a diagram illustrating waveforms of ultrasonic wave outputted from an ultrasonic wave output device.

As shown in FIG. 4, the controller 13 controls the ultrasonic output device 11 and the ultrasonic output device 11 outputs the ultrasonic wave that is modulated so that the maximum value or the minimum value (see FIG. 4 for the maximum point Pmx and the minimum point Pmn) of the ultrasonic wave having the ultrasonic wave output frequency Fu (see FIG. 4 for the ultrasonic wave period Tu) are changed with a predetermined modulation frequency Fm (see FIG. 4 for the modulation period Td). The modulation frequency Fm is selected from among predetermined multiple detectable frequencies. The detectable frequencies are frequencies that are detectable by the speech input device 44. In the present embodiment, for example, two detectable frequencies of 17 kHz and 19 kHz are set. The detectable frequency is determined so that the integral multiple of the detectable frequency does not coincide with the ultrasonic wave output frequency Fu. This is because when the detectable frequency coincides with the ultrasonic wave output frequency Fu, this makes smaller the amplitude of the ultrasonic wave outputted from the ultrasonic output device 11. For example, two times as large as the 20 kHz is 40 kHz, which coincides with the ultrasonic wave output frequency Fu. For this reason, 20 kHz is excluded from the detectable frequency.

The controller 13 makes the ultrasonic output device 11 output the ultrasonic wave whose modulation frequency Fm varies in accordance with the installation position information indicating a position (n-th floor, latitude, longitude) where the positional information output apparatus 2 is installed. For example, the controller 48 expresses the installation position information by digital data with two or more bits, and divides this digital data on a bit-by-bit basis. For each divided one bit, the controller 48 modulates the ultrasonic wave with the modulation frequency Fm corresponding to the 1 bit data, and sequentially outputs the modulated ultrasonic wave with the ultrasonic output device 11.

For example, for the data representing "1", the ultrasonic output device 11 uses the modulation frequency Fm of 19 kHz. For the data representing "0", the ultrasonic output device 11 uses the modulation frequency Fm of 17 kHz. In the present disclosure, the ultrasonic wave outputted from the ultrasonic output device 11 is also called an ultrasonic wave positioning signal.

Figure 5:
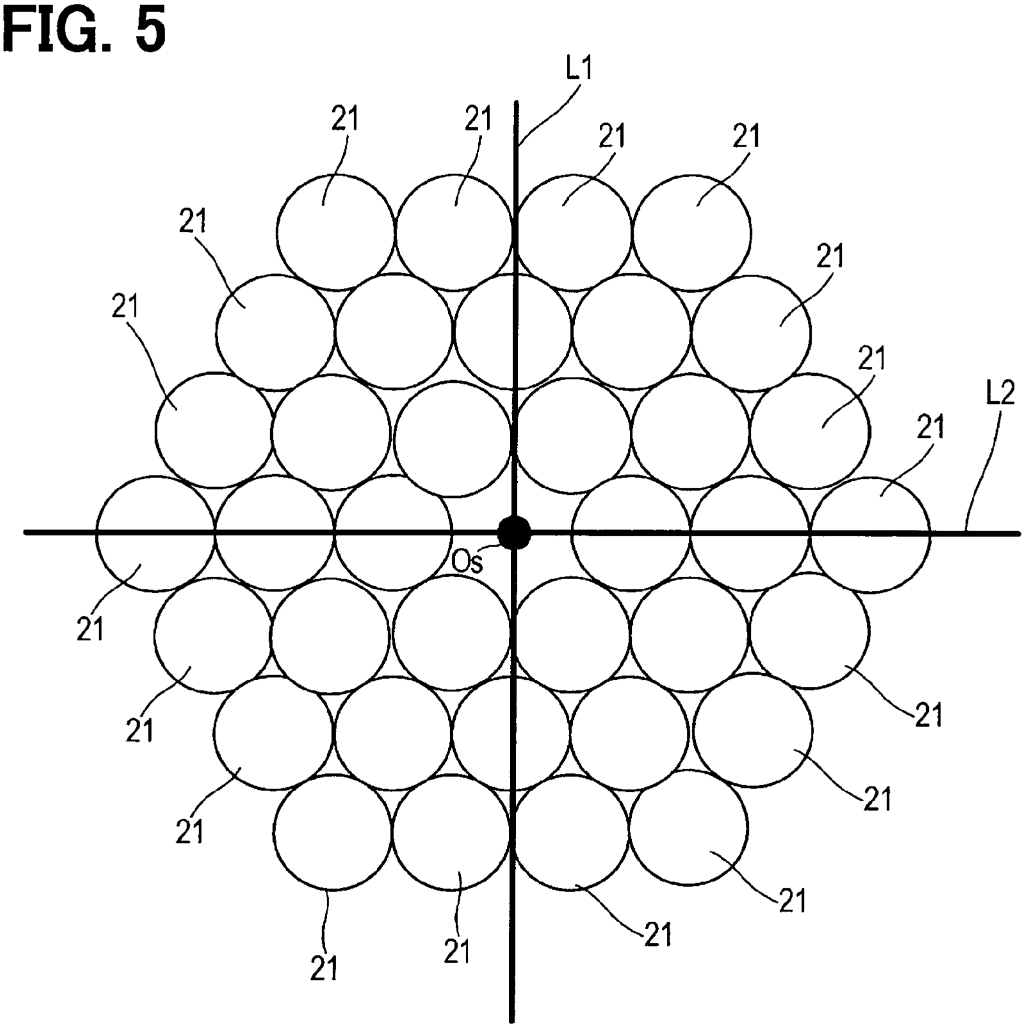
FIG. 5 is a plane view illustrating an arrangement of ultrasonic speakers.

As shown in FIG. 5, the multiple ultrasonic speakers 21 are arranged on a plane surface defining the ceiling CL so as to be symmetrical with respect to the center Os.

Figure 6:
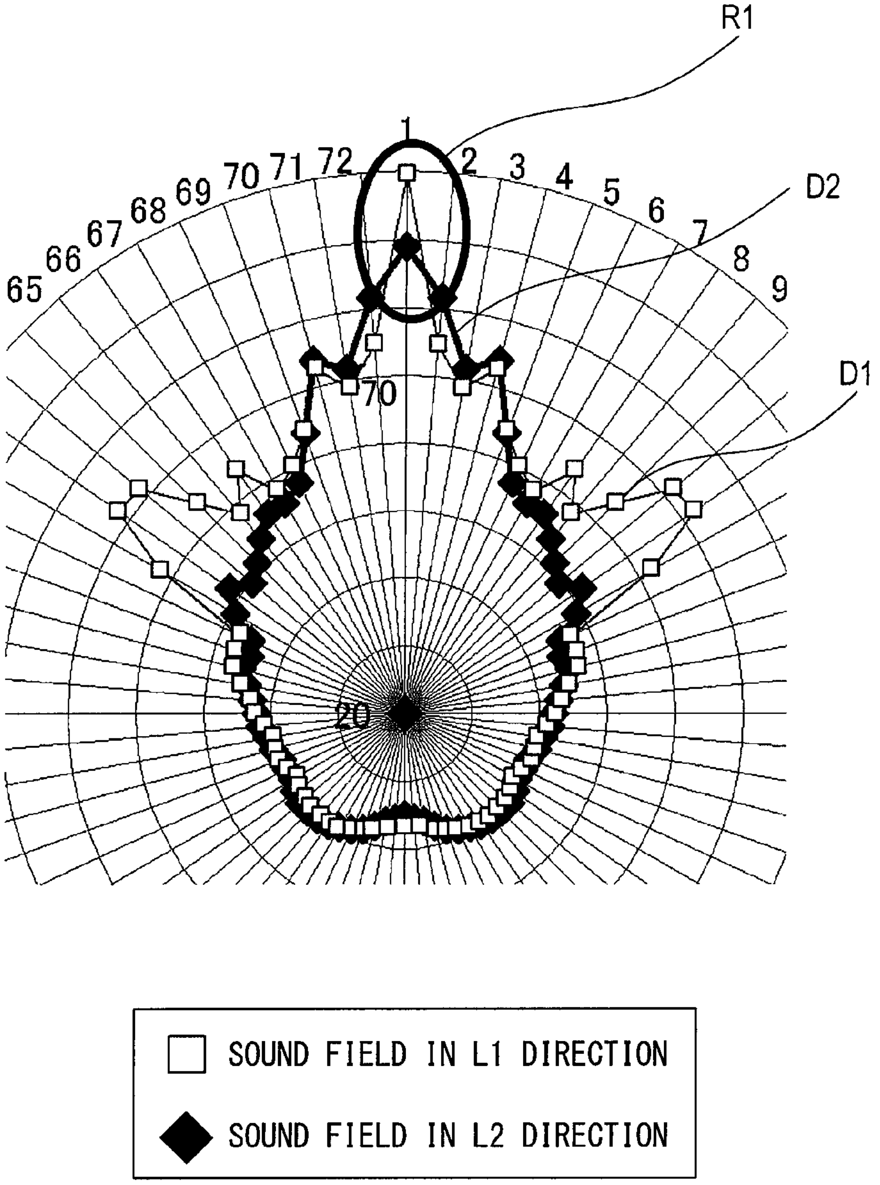
FIG. 6 is a diagram illustrating a sound field distribution of ultrasonic wave in the indoor positioning system.

FIG. 6 is a diagram illustrating a sound field distribution D1 in a direction along a straight line L1 of FIG. 5 and a sound field distribution D2 in a direction along a straight line L2 of FIG. 5. As shown in FIG. 6, a region having a high sound pressure level is concentrated in a single spot (see FIG. 6 for a high sound field region R1) and the ultrasound wave outputted from the ultrasonic speakers 21 has high directivity.

In this indoor positioning system, 1, the controller 48 of the portable terminal 3 performs a positioning process. While in operation, the controller 48 repeatedly executes the positioning process.

Figure 7:
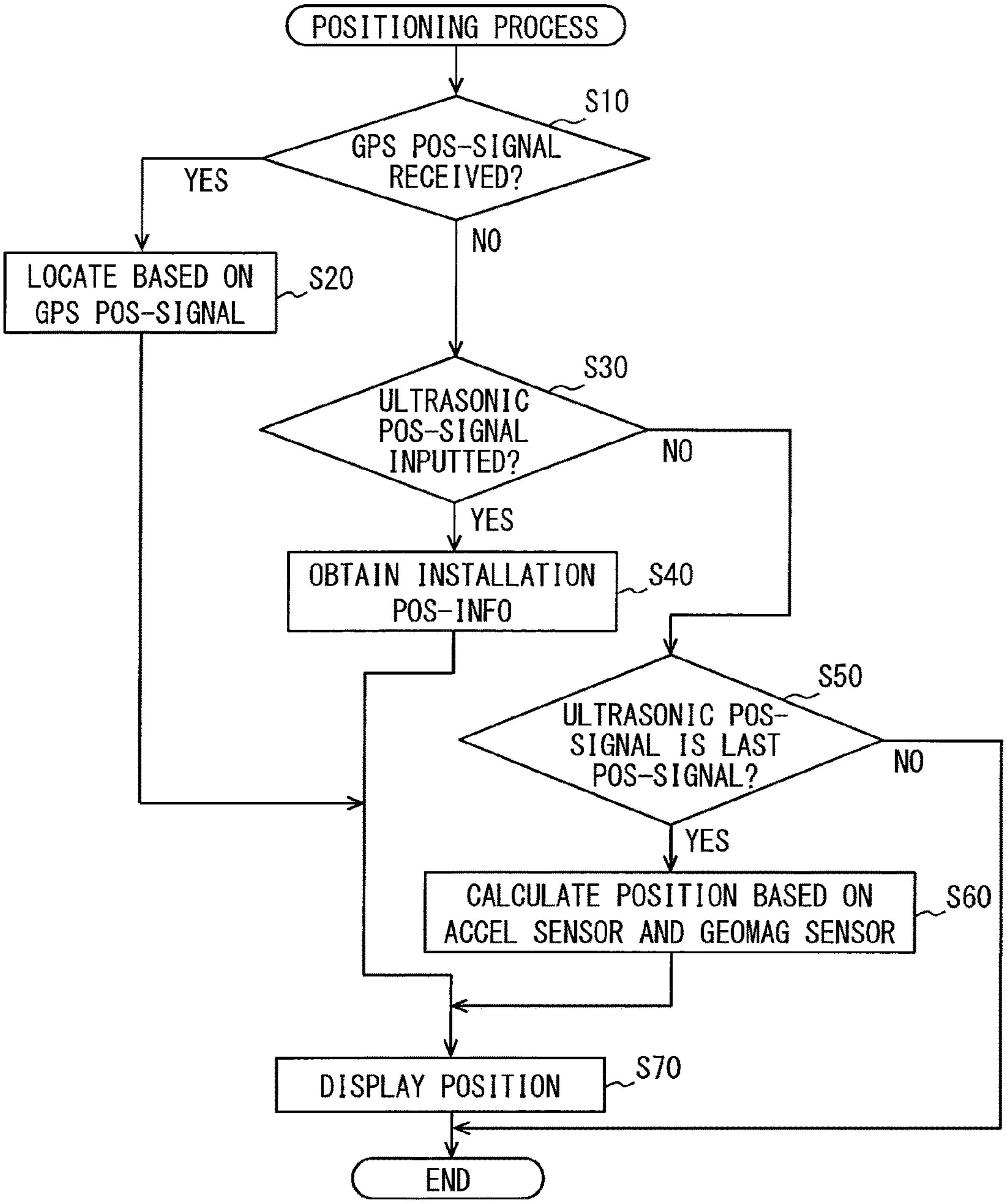
FIG. 7 is a flowchart illustrating a positioning process.

As shown in FIG. 7, at S10, the controller 48 first determines whether or not the GPS positioning signal is received with the GPS receiver 43. When the GPS positioning signal is received (YES at S10), the process proceeds to S20. At S20, the controller 48 measures the position of the portable terminal 3 based on the information contained in the received GPS positioning signal. Then, the process proceeds to S70.

When no GPS positioning signal is received (NO at S10), the process proceeds to S30. At S30, the controller 48 determines whether or not the ultrasonic wave positioning signal is inputted to the speech input device 44. When the ultrasonic wave positioning signal is inputted (YES at S30), the process proceeds to S40. At S40, the controller 48 performs frequency analysis of the inputted ultrasonic wave positioning signal. The controller 48 thereby acquires the above-described installation position information from the ultrasonic wave positioning signal and designates the position indicated by this installation position information as the position of the portable terminal 3. After S40, the process proceeds to S70.

When the ultrasonic wave positioning signal is not inputted (NO at S30), the controller 48 determines at S50 whether or not the positioning signal acquired most recently is the ultrasonic wave positioning signal. When the positioning signal acquired most recently is the GPS positioning signal (NO at S50), the positioning process is ended. When the positioning signal acquired most recently is the ultrasonic wave positioning signal (YES at S50), the process proceeds to S60. At S60, the controller 48 calculates the position of the portable terminal 3 based on detection results of the acceleration sensor 46 and the geomagnetic sensor 47. The process then proceeds to S70.

At S70, the controller 48 displays on the display device 41 the information indicating the position acquired by any one of S20, S40 and S60, and the positioning process is ended.

The position information output apparatus 2 of the indoor positioning system 1 includes the ultrasonic output device 11 and the controller 13.

The ultrasonic output device 11 outputs the ultrasonic wave having the ultrasonic output frequency Fu. The controller 13 has multiple detectable frequencies (e.g., 19 kHz and 19 kHz in this embodiment) which are within a frequency range detectable by the speech input device 44 of the portable terminal 3 and which are set lower than the ultrasonic wave output frequency Fu. In accordance with contents of the installation position information, the controller 13 sequentially select one detectable frequency as a modulation frequency Fm from among the multiple detectable frequencies, and controls the ultrasonic output device 11 so that a maximum value and a minimum value of the amplitude of the ultrasonic wave vary with the selected modulation frequency Fm.

The position information output apparatus 2 uses the ultrasonic wave to convey the installation position information to the portable terminal 3. The ultrasonic wave has high directivity. Therefore, the position information output apparatus 2 prevents a large difference between the present position indicated by the ultrasonic wave inputted to the speech input device 44 of the portable terminal 3 and the actual position.

Furthermore, in accordance with the contents of the installation position information, the positional information output apparatus 2 outputs the ultrasonic wave modulated with the modulation frequency Fm, which is detectable by the audio input part 44. For this reason, the portable terminal 3 can acquire the installation position information by detecting the modulation frequency of the ultrasonic wave inputted into the speech input device 44. Therefore, according to the positional information output apparatus 2, it becomes possible to provide the installation position information to the portable terminal 3 without replacing the portable terminal 3. It is noted that the portable terminal 3 can use the speech input device 44, which is originally equipped for a telephone communication function, in order to the input of the ultrasonic wave outputted from the position information output apparatus 2. Furthermore, since the positional information output apparatus 2 is not required to be connected to a network, a new installation of the positional information output apparatus 2 does not require a network installation construction. Furthermore, when the ultrasonic wave outputted downward from the positional information output apparatus 2 installed on the ceiling is reflected at the floor, there is a low possibility that this reflected wave is inputted into the speech input device 44 of the portable terminal 3. A user of the portable terminal 3 typically manipulates the portable terminal 3 with the display screen facing upward. Because the ultrasonic wave outputted from the positional information output apparatus 2 has high directivity, when the ultrasonic wave is reflected at the floor and reaches an opposite side of the portable terminal 3 from the display screen, this reflected way hardly reaches the speech input device 44 disposed on a display screen side of the portable terminal 3.

Moreover, the portable terminal 3 detects the modulation frequency Fm of the ultrasonic wave inputted into the audio input device 44, and acquires the installation position information from the ultrasonic wave based on the detected modulation frequency Fm (S40). The ultrasonic output frequency Fu differs from the integral multiple of the modulation frequency Fm. Therefore, a decrease in the amplitude of the ultrasonic wave outputted from the positional information output apparatus 2 is suppressed.

The portable terminal 3 can acquire the installation position information by receiving the ultrasonic wave from the positional information output apparatus 2, and the portable terminal 3 constituted in this way can acquire installation position information, and can obtain the same technical effects as the positional information output apparatus 2.

In the above-illustrated embodiment, the positional information output apparatuses 2 corresponds to an example of a position information providing apparatus. The portable terminal 3 corresponds to an example of a position information notifier apparatus. The ultrasonic output device 11 corresponds to an example of an ultrasonic wave output means. The controller 13 corresponds to an example of a control means. S40 corresponds to an example of a position information acquisition means.

Embodiments are not limited to the above-illustrated embodiment and can have various forms.

For example, in the above embodiment, the ultrasonic wave is outputted downward from the ceiling. Alternatively, the ultrasonic wave may be outputted outward from the floor.

Figure 8:
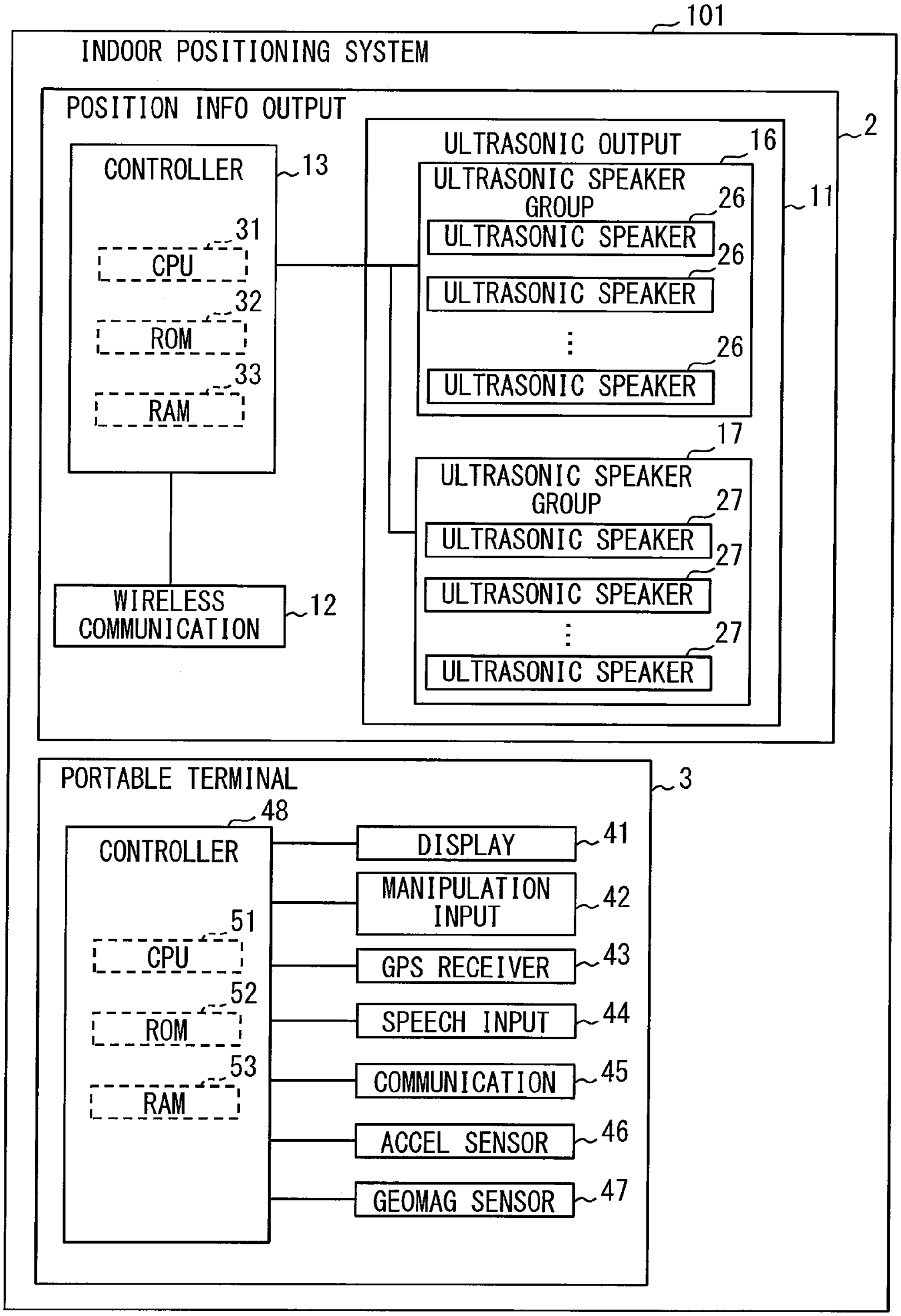
FIG. 8 is a block diagram illustrating an indoor positioning system according to a modified embodiment.

In the above embodiment, the multiple ultrasonic speakers 21 output the same-phase ultrasonic wave. Alternatively the multiple ultrasonic speakers may simultaneously output the normal-phase ultrasonic wave and the reverse-phase ultrasonic wave. FIG. 8 is a block diagram illustrating an indoor positioning system 101 configured to output the normal-phase ultrasonic wave and the reverse-phase ultrasonic wave.

As shown in FIG. 8, the indoor positioning system 101 differs from the system of the first embodiment in that the indoor positioning system 101 includes ultrasonic speaker groups 16, 17 in place of the multiple (thirty six) ultrasonic speakers 21. Each ultrasonic speaker group 16, 17 includes multiple ultrasonic speakers (e.g., eighteen in this embodiment). Specifically, the ultrasonic speaker group 16 includes multiple ultrasonic speakers 26 and the ultrasonic speaker group 17 includes multiple ultrasonic speakers 27. The ultrasonic speakers 26, 27 output the ultrasonic wave having the above-described ultrasonic wave output frequency. The ultrasonic speakers 26 correspond to an example of a first ultrasonic speaker. The ultrasonic speakers 27 correspond to an example of a second ultrasonic speaker.

Figure 9:
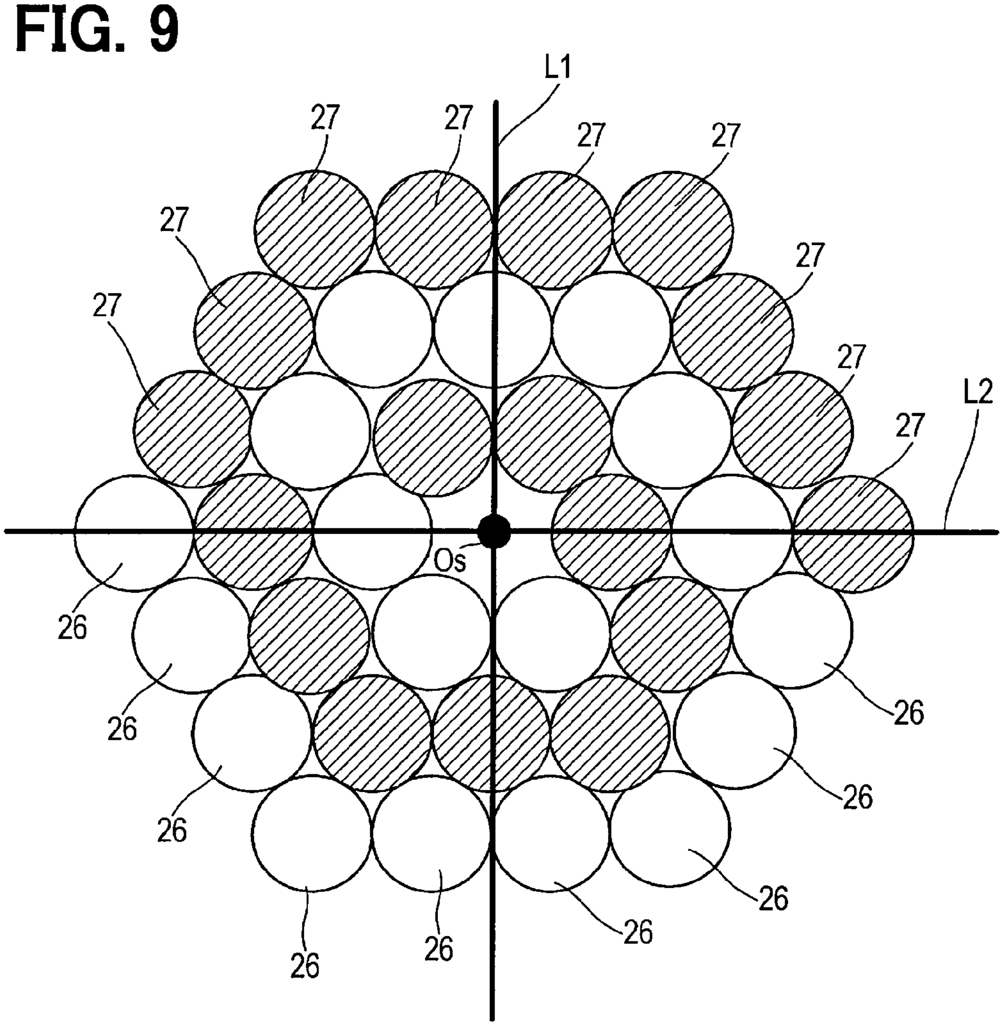
FIG. 9 is a plane view illustrating an arrangement of ultrasonic speakers.

As shown in FIG. 9, the multiple ultrasonic speakers 26 constituting the ultrasonic speaker group 16 are arranged in a spiral along a plane surface defining the ceiling (also referred to as a ceiling surface). Similarly, the multiple ultrasonic speakers 27 constituting the ultrasonic speaker group 17 are arranged in a spiral along the ceiling surface. Specifically, an arrangement of the ultrasonic speakers 26 is neither point-symmetry with respect to the center Os nor line symmetry with respect to a straight line passing through the center Os. This is the case in an arrangement of the ultrasonic speakers 27.

The ultrasonic speaker groups 16, 17 are installed in such a manner that the ultrasonic speaker 26 and the ultrasonic speaker 27 are alternately arranged in an outwardly radial direction from the center of the spiral. The normal-phase ultrasonic wave and the reverse-phase ultrasonic wave, which respectively are outputted from the ultrasonic speaker 26 and the ultrasonic speaker 27 adjacent to each other, weaken sound pressure levels of each other.

Figure 10:
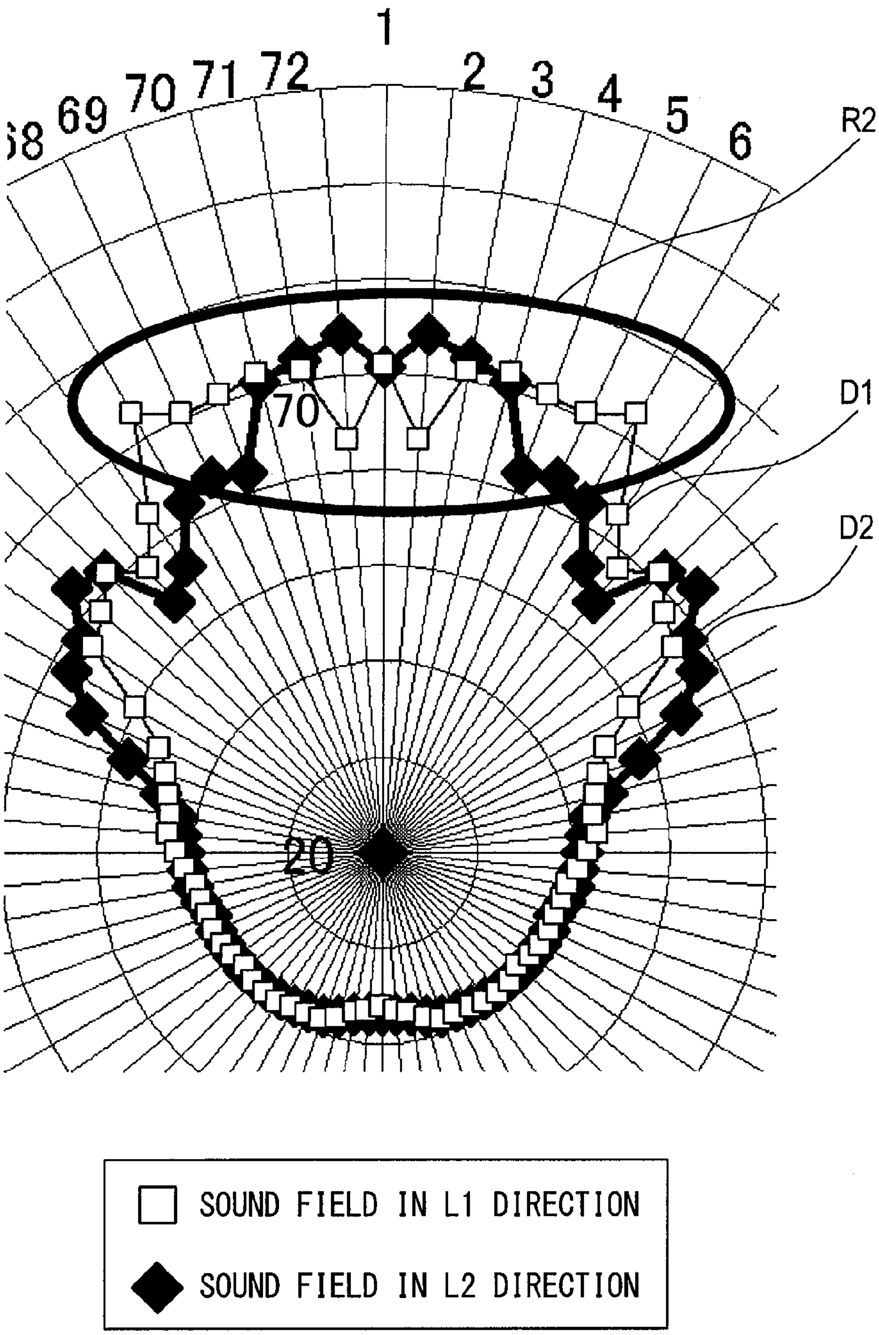
FIG. 10 is a diagram illustrating a sound field distribution of the ultrasonic wave in the indoor positioning system.

FIG. 10 is a diagram illustrating a sound field distribution D1 in a direction along a straight line L1 of FIG. 9 and a sound field distribution D2 in a direction along a straight line L2 of FIG. 9. As shown in FIG. 10, a high sound pressure level region is concentrated in one place (see FIG. 10 for a high sound field R2), and the ultrasonic wave outputted from the ultrasonic speakers 26, 27 has high directivity. It is noted that the high sound field R2 in FIG. 10 is larger than the high sound field R1 of FIG. 6. That is, when the normal-phase ultrasonic wave and the reverse-phase ultrasonic wave are outputted, the directivity of the ultrasonic wave decreases as compared with cases where all the ultrasonic speakers output the normal-phase ultrasonic wave.

Figure 11:
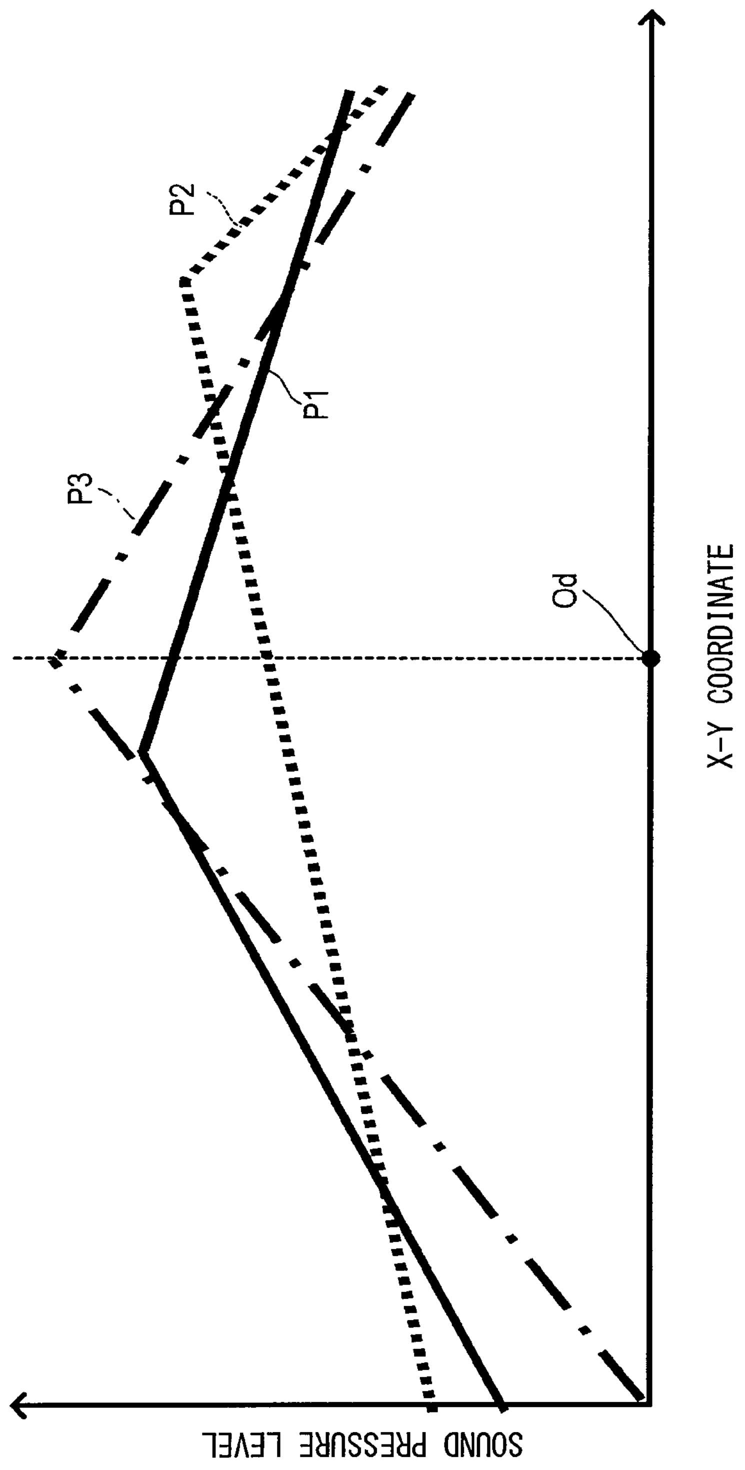
FIG. 11 is a diagram illustrating sound pressure level distributions.

FIG. 11 is a diagram illustrating the sound pressure level distributions P1, P2 of the indoor positioning system 101 and the sound pressure level distribution P3 of the indoor positioning system 1. The sound pressure level distributions P1, P2, P3 denote the sound pressure levels in the vicinity of the floor below the installation position of the ultrasonic output device 11.

The gradients of the sound pressure levels P1, P2 of the indoor positioning system 101 are smaller than that of the sound pressure level P3 of the indoor positioning system 1. That is, the directivity of the ultrasonic wave in the indoor positioning system 101 is smaller than that in the indoor positioning system 1. This is because the normal-phase ultrasonic wave and the reverse-phase ultrasonic wave weaken each other to decrease their sound pressure levels.

The sound pressure level distributions P1, P2 denote the sound pressure levels in directions along the straight lines (see FIG. 9 for the straight lines L1, L2) passing through the center Os of FIG. 9. The sound pressure level distributions P1, P2 denote the sound pressure levels along different straight lines. The center Od of FIG. 11 opposes to the center Os of FIG. 9 in an upper-lower direction.

As illustrated by the sound pressure level distributions P1, P2 of FIG. 11, the sound pressure level distribution in the indoor positioning system 101 varies depending on directions of straight lines passing through the center Od. Therefore, the portable terminal 3 can calculate the position relative to the center Od by detecting the sound pressure level of the ultrasonic wave inputted to the speech input device 44.

As illustrated by the sound pressure level distribution P3 of FIG. 11, the sound pressure level distribution in the indoor positioning system 1 does not vary depending on directions of straight lines passing through the center Od. However, in the sound pressure level distribution P3, the sound pressure level gradually decreases with increasing distance from the center Od. Therefore, when the portable terminal 3 is in a one-way movable place such as a narrow width passage where a movable direction is only one way, the portable terminal 3 can calculate the position relative to the center Od by detecting the sound pressure level of the ultrasonic wave inputted to the speech input device 44.

Although embodiments and configurations according to the present disclosure have been illustrated, embodiments and configurations according to the present disclosure are not limited to the respective embodiments and configurations described above. Embodiments and configurations obtained by combining technical elements disclosed in different embodiments and configurations also fall within the scope of embodiments and configurations according to the present disclosure.

What is claimed is:

1. A position information providing apparatus for providing present position information indicating a present position to a position notifier apparatus having a function to notify the present position, the position information providing apparatus comprising:

an ultrasonic wave output device that outputs ultrasonic wave having a predetermined ultrasonic frequency;

a controller that has a plurality of predetermined detectable frequencies which are within a frequency range detectable by a speech input device of the position notifier apparatus and which are lower than the ultrasonic wave frequency, sequentially selects one detectable frequency as a modulation frequency from among the plurality of detectable frequencies in accordance with contents of the present position information, and controls the ultrasonic wave output device so that a maximum value or a minimum value of amplitude of the ultrasonic wave varies with the selected modulation frequency, wherein the ultrasonic wave output device includes a plurality of first ultrasonic speakers for outputting the ultrasonic wave that is normal-phase, and a plurality of second ultrasonic speakers for outputting the ultrasonic wave that is reverse-phase, the plurality of first ultrasonic speakers are arranged in an outward spiral from a predetermined center point along an installation surface, wherein the installation surface is perpendicular to an ultrasonic wave output direction in which the ultrasonic wave output device outputs the ultrasonic wave;

the plurality of second ultrasonic speakers are arranged in an outward spiral from the predetermined center point along the installation surface; and the plurality of first ultrasonic speakers and the plurality of second ultrasonic speakers are alternately arranged in an outwardly radial direction from the predetermined center point.

2. The position information providing apparatus according to claim 1, wherein, the ultrasonic wave frequency differs from each integral multiple of the modulation frequency.

3. A position notifier apparatus having a function to notify a present position, the position notifier apparatus comprising:

an speech input device for inputting ultrasonic wave outputted from the position information providing apparatus recited in claim 1; and a position information acquisition device that detects the modulation frequency of the ultrasonic wave inputted to the speech input device, and acquires the present position from the ultrasonic wave based on the detected modulation frequency.

4. A program that causes a computer to function as the position information acquisition device of the position notifier apparatus recited in claim 3.

5. A non-transitory computer readable storage medium storing the program recited in claim 4.

6. A position information providing apparatus for providing present position information indicating a present position to a position notifier apparatus having a function to notify the present position, the position information providing apparatus comprising:

an ultrasonic wave output device that outputs ultrasonic wave having a predetermined ultrasonic frequency;

a controller that has a plurality of predetermined detectable frequencies which are within a frequency range detectable by a speech input device of the position notifier apparatus and which are lower than the ultrasonic wave frequency, sequentially selects one detectable frequency as a modulation frequency from among the plurality of detectable frequencies in accordance with contents of the present position information, and controls the ultrasonic wave output device so that a maximum value or a minimum value of amplitude of the ultrasonic wave varies with the selected modulation frequency, wherein, the ultrasonic wave output device is configured to output a sound pressure level, the sound pressure level gradually decreasing with increasing distance from a center corresponding to a center position of the ultrasonic wave output device such that the position notifier apparatus calculates the center position relative to the center by detecting the sound pressure level of the ultrasonic wave.

7. A position information providing apparatus for providing present position information indicating a present position to a position notifier apparatus having a function to notify the present position, the position information providing apparatus comprising:

an ultrasonic wave output device that outputs ultrasonic wave having a predetermined ultrasonic frequency;

a controller that has a plurality of predetermined detectable frequencies which are within a frequency range detectable by a speech input device of the position notifier apparatus and which are lower than the ultrasonic wave frequency, sequentially selects one detectable frequency as a modulation frequency from among the plurality of detectable frequencies in accordance with contents of the present position information, and controls the ultrasonic wave output device so that a maximum value or a minimum value of amplitude of the ultrasonic wave varies with the selected modulation frequency, wherein, the ultrasonic wave output device is configured to output two sound pressure levels, the two sound pressure levels denoting the sound pressure levels along different straight lines from a center corresponding to a center position of the ultrasonic wave output device such that the position notifier apparatus calculates the center position relative to the center by detecting the sound pressure levels of the ultrasonic wave.

* * * * *